H. KLECKLER.
TRIPLANE.
APPLICATION FILED FEB. 8, 1917.
1,290,235.
Patented Jan. 7, 1919.
3 SHEETS—SHEET 3.
FIG. 4.
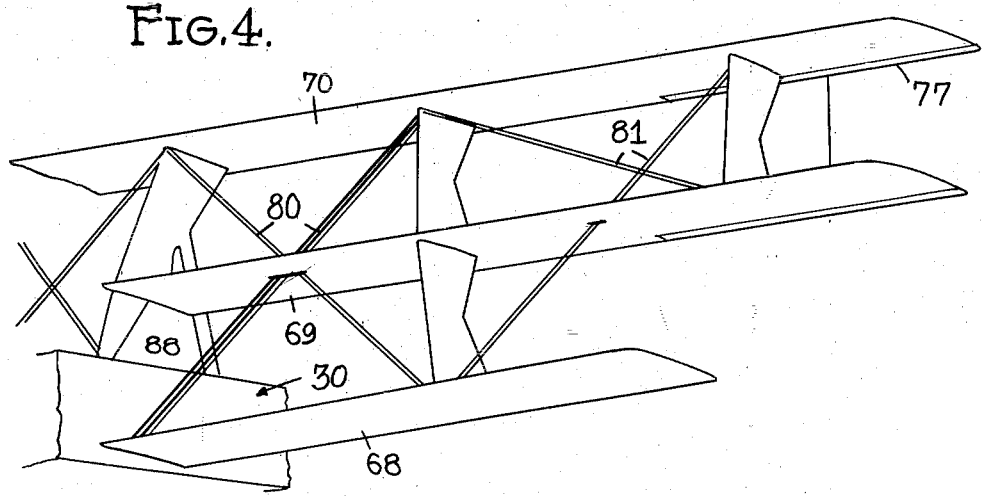
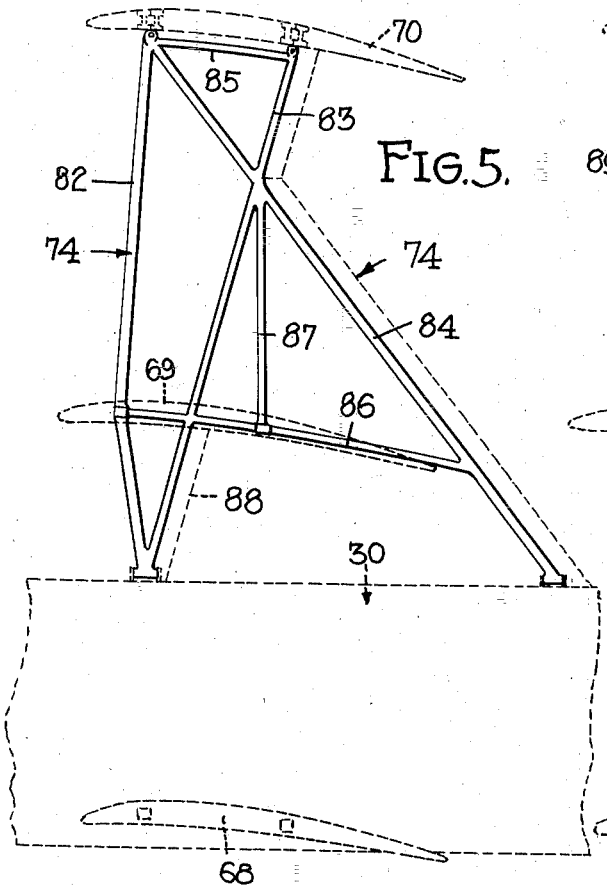
FIG. 5.
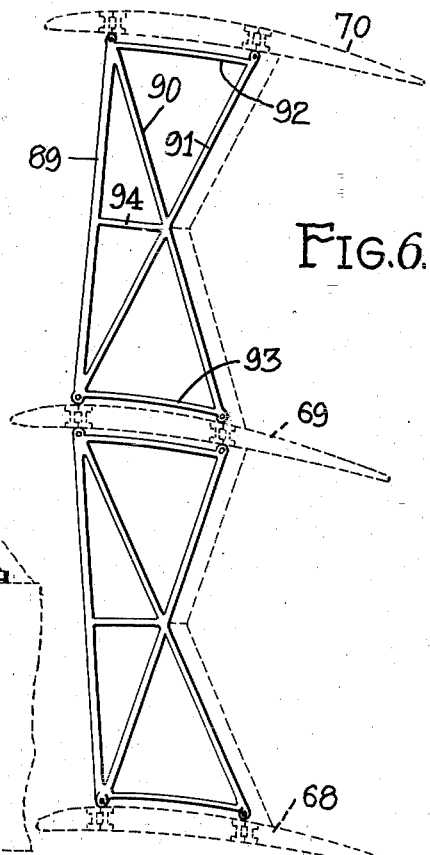
FIG. 6.
Inventor
HENRY KLECKLER
By
Attorney

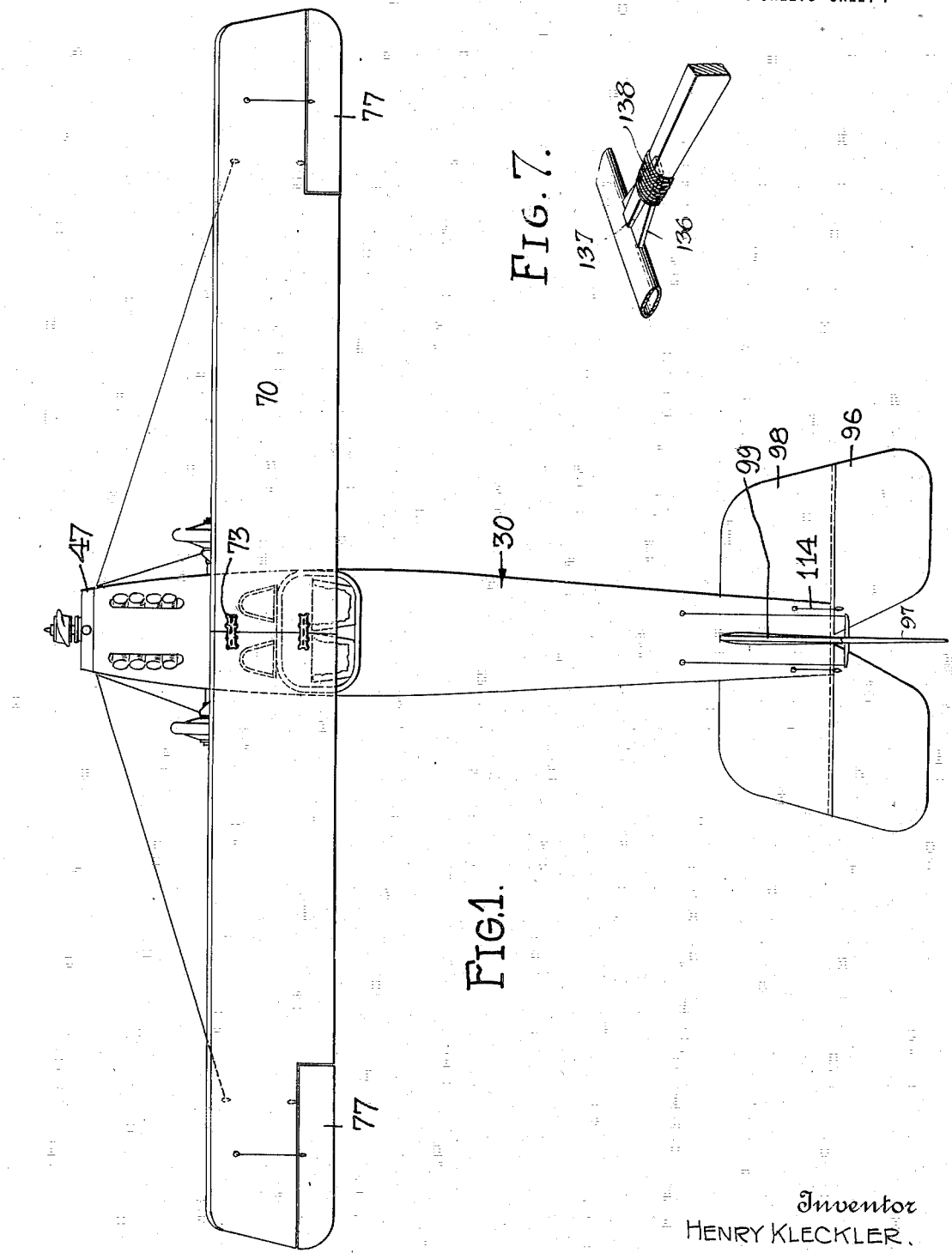

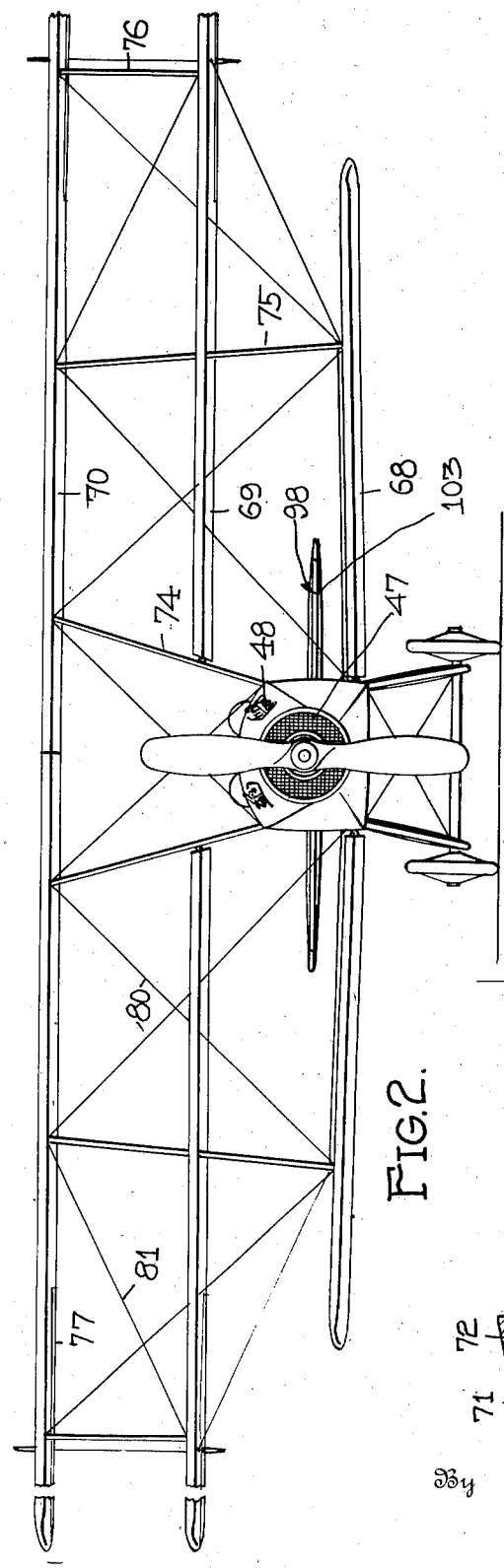
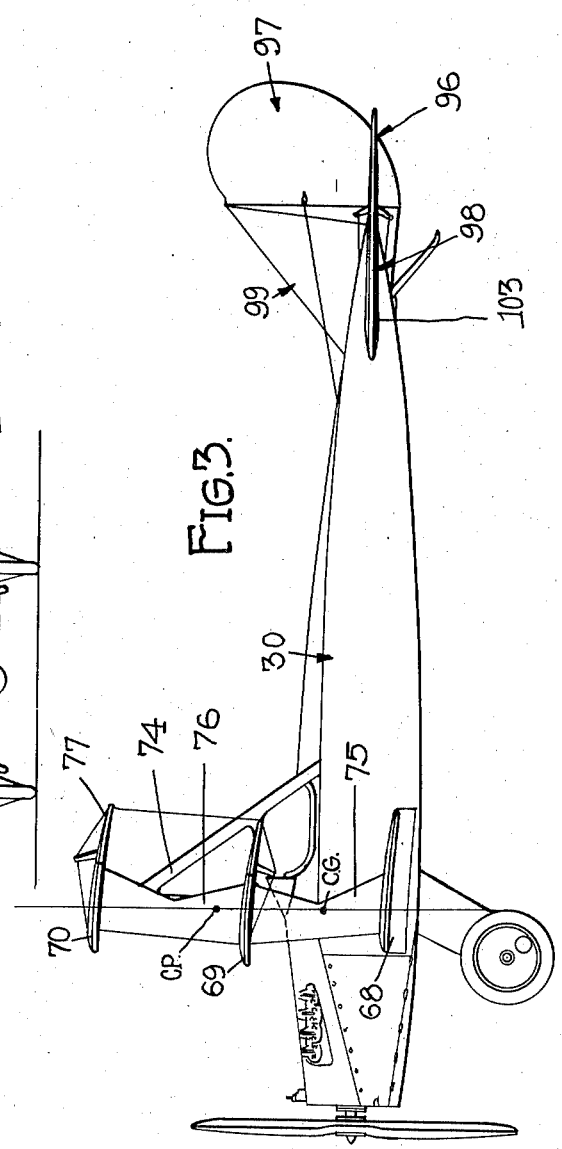
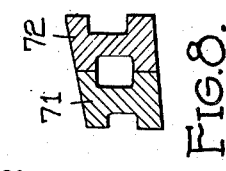

UNITED STATES PATENT OFFICE.

HENRY KLECKLER, OF BUFFALO, NEW YORK, ASSIGNOR TO CURTISS AEROPLANE AND MOTOR CORPORATION, A CORPORATION OF NEW YORK.

TRIPLANE.

1,290,235.            Specification of Letters Patent.          Patented Jan. 7, 1919.

Application filed February 8, 1917. Serial No. 147,414.

*To all whom it may concern:*

Be it known that I, HENRY KLECKLER, a citizen of the United States, residing at Buffalo, in the county of Erie and State of New York, have invented certain new and useful Improvements in Triplanes, of which the following is a specification.

My invention relates to aircraft designed primarily for slow speed training purposes although possessing characteristics which render it adaptable for high speed work and heavy duty military use. It is characterized by a relatively wide fuselage having a length to width ratio considerably higher than the corresponding ratio of fuselages constructed as at present. Special novelty is evidenced in the arrangement of the triplane wings. The bottom wings or supporting surfaces project right and left from the bottom of the fuselage, the intermediate wings right and left from diverging fuselage or center wing posts, and the topmost wings right and left from a line in the vertical plane of the fore and aft axis of the craft. The gap between the upper and intermediate wings is such that the latter lie in a plane considerably above the top of the fuselage whereby an unobstructed vision can be had through a complete circle of three hundred and sixty (360°) degrees in a horizontal plane. Compression being taken on the upper wings, the intermediate wings are discontinued at the fuselage so as to leave an open and unobstructed space between the diverging posts and a very large range of gun fire and vision ahead and around the propeller is produced. The machine is of the tractor type with its motor placed low at the nose; hence the propeller in its revolution interferes but little with gun fire directly ahead. Moreover, an open space is left between the struts of the fuselage wing posts to permit of firing laterally between the leading and trailing edges thereof. All of the wings are of shallow depth of chord and the seats in the fuselage arranged side by side preferably intermediate the center posts. Dual control may or may not be used.

As a further object of the invention it is proposed to forwardly or positively stagger the intermediate wings (with respect to the lower) and rearwardly or negatively stagger the topmost wings (with respect to the intermediate) to permit of intertying of said lower and topmost wings in the planes of the corresponding wing beams which found them. This gives to the wing structure in its entirety added strength and provides for the elimination of separate tie wires which ordinarily interconnect separately the intermediate, upper and lower wings. For increased lift at points deemed most effective the intermediate and upper wings are coextensive and of a span to extend laterally considerably beyond the tips of the lower wing. The extended or overhanging portions of said intermediate and upper wings are interconnected by wing posts which interbrace said overhanging portions independently of the lower wing. Furthermore, the center and next adjacent wing posts are angularly inclined to provide points of support for the upper wing approximately equidistantly spaced.

Of the drawings, wherein like numerals of reference designate like or corresponding parts:

Figure 1 is a top plan view of the improved machine;

Fig. 2 is a front end elevation;

Fig. 3 is a side elevation;

Fig. 4 is a view illustrating diagrammatically and in perspective one half of the triplane wing structure;

Fig. 5 is a side elevation of one of the center wing post frames;

Fig. 6 is a side elevation of the alined intermediate wing post frames;

Fig. 7 is a detail of an aerofoil rib-fastening means; and

Fig. 8 is an enlarged cross section of one of the wing beams.

The supporting surfaces of the craft extend intermediately across the fuselage designated in its entirety by the numeral 30, in the plane of the engine section thereof, the lower wings 68 extending right and left, at a slight dihedral, from the opposite sides of the fuselage, the intermediate wings 69 right and left in a plane above the top of the fuselage and the top wing 70 right and left in a plane considerably above the plane of the intermediate wings. The wing beams of each wing are constructed in duplicate, each wing beam comprising connected beams 71 and 72, each of I-form in cross section. These beams are contiguous throughout and coextensive, the said beams collectively constituting a beam of box form (see Fig. 8), The wing beams of the upper wings or plane abut terminally in the vertical plane of the fore and aft axis of the craft where they are fastened together by overlapping plates 73 arranged respectively upon the top and bottom surfaces of the beams. These fittings or plates are inclosed in the fabric covering of the wings.

Upwardly diverging wing posts or wing struts 74 founded upon the fuselage centrally support the upper wings 70 and the intermediate wings 69. Said upper supporting surface 70 is continuous from tip to tip and equal in span to that of the intermediate plane 69, the latter, however, being discontinued or interrupted at its center to provide an unobstructed observation range and gun fire arc directly ahead and substantially overhead. The posts 74 centrally support said intermediate wings.

Intermediate wing posts 75 converge upwardly that the points of support for the upper plane 70 may be equidistantly spaced. Said intermediate posts 75 interconnect respectively the lower wings 68 and the intermediate wings 69 and the intermediate wings 69 and the upper wings 70, the posts in each instance being alined. Terminal wing posts 76 interconnect the intermediate wings 69 and the upper wings 70 in a plane out beyond the vertical plane of the wing tips of the lower wings 68. That portion of the wing structure extending laterally beyond the tips of said lower wings may be described as a biplane overhang since said intermediate and upper planes are coextensive. Ailerons 77 are provided at the outer extremities of the intermediate and upper wings.

Although superposed, the wings of the triplane are not directly superposed since the intermediate wings are forwardly staggered slightly with respect to the top and bottom wings. The wing beams of adjacent wings are thus disposed in unalined planes. This construction and arrangement is advantageous in that the upper and lower wings may be directly interconnected in the planes of the respective beams by tie wires 80 cross arranged, the wires in each instance penetrating the intermediate wings. The lower wings 68 being under tension and the upper wings 70 under compression, said intermediate wings do not require the interbracing ordinarily necessary in effectually trussing the wings. Tie wires 81, however, interconnect the intermediate wings and the upper wings in the vicinity of the overhangs.

The degree of stagger of the supporting surfaces, both negative and positive, is such that a line passing vertically through the center of pressure of the lower supporting surface (or in fact any one of the supporting surfaces) will intersect all of the supporting surfaces thereabove. In other words all of the supporting surfaces enter into and constitute a single wing structure and not a wing structure comprising a number of longitudinally spaced supporting surfaces.

The center wing posts 74, as intimated, diverge upwardly, each post supporting an individual wing of the intermediate plane. The posts are therefore in each instance made somewhat deeper and stronger than the intermediate posts 75 and terminal posts 76. Each post 74 comprises a wing post frame of substantially K-form, three post struts being provided. One of said post struts 82 is fastened to the fuselage and penetrates or rather continues beyond the plane of the intermediate supporting surface for termination in the plane of the upper supporting surface where it is fastened to the forward wing beam of said surface by any suitable means. The two remaining wing post struts, 83 and 84 intersect to provide a cross brace, said struts terminally abutting the beams of the upper plane and the fuselage. Both struts 83 and 84 extend in a straight line throughout, the point of intersection thereof being disposed in the vicinity of the upper plane that the base or foot of the wing post may be relatively enlarged.

There is provided in the vicinity of the upper wing 70 a cross brace 85 and in the vicinity of the intermediate wing 69 a cross brace 86. The cross brace 85 interconnects the upper ends of the strut 83 and the strut 82 and the cross brace 86 interconnects the strut 84 and the strut 82. The cross brace 86 however is intermediately braced by a vertically extending brace 87 forming a part of the wing post frame.

To decrease the head resistance during flight, the frames of the wing post 74 are streamlined as a unit except at the enlarged lower end, that portion of each post in the vicinity of the fuselage being open as indicated at 88 to provide an unobstructed range of vision laterally between the leading and trailing edges of the wing posts. The dotted lines of Fig. 5 indicate clearly this opening and also the manner in which the posts are covered. Furthermore, each post functions as an anti-skid plane.

The outer or remaining wing posts 75 and 76 are likewise of substantially K-form, the wing posts in each instance being of the same construction. The frames of said posts 75 and 76 comprise in addition to the vertical strut 89, the cross arranged struts 90 and 91 and the cross braces 92 and 93, a center cross brace 94. The cross brace 94 connects the forward vertical strut 89 with the crossed struts 90 and 91 at their point of intersection. The intersecting points of said struts, unlike the corresponding struts of the center posts 74, lie approximately equidistant from the respective wings that the size of the wing post at its top and bottom may be substantially uniform. The cross braces 85 of the center wing posts and the cross braces 92 and 93 of the remaining wing posts, by reason of their disposition in close proximity to the wings, function conjointly as compression members and accordingly permit of wing frames considerably lighter per unit of area than wing frames ordinarily used.

All of the wings are characterized by an unusually shallow chord. Both the gun fire range and the range of vision from the cockpit of the craft are unusually large, the wing post formation and the wing formation being conducive to this end. Preferably the cockpit lies intermediate or a little aft of the center struts 74.

The tail end of the fuselage tapers rearwardly to a horizontal edge, aft of and in line with which the elevator flaps 96 are disposed. Said flaps lie symmetrically at opposite sides of the fore and aft axis of the craft, the adjacent edges of the co-acting flaps defining an operating space for the rudder 97 of the craft.

In advance of the directional control surfaces 96 and 97 the stabilizing surfaces 98 and 99 are provided, the horizontal stabilizing surface 98 continuing the elevator flaps 96 forwardly and the vertical stabilizing surface 99 continuing the rudder 97 forwardly (see Fig. 1).

The aeroplane wings, the directional control surfaces, the ailerons, and in fact all aerofoil surfaces in which ribs and metal frames are used as components are to be equipped with retaining plates 136 brazed or otherwise integrally united to the frames. These plates (see Fig. 7) are intended to engage in bifurcations 137 formed in the ribs of the aerofoil surface. Being thus arranged the plates and ribs are separately wrapped as at 138. A rigid fastening is thus provided and a better streamline obtained.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. An airplane wing truss including cross arranged lift and drop wires, the outer ends of the wires being fastened to adjacent wings and the inner ends to non-adjacent wings.

2. An airplane wing truss including cross arranged lift and drop wires, the outer ends of the wires being fastened to wings in closer proximity to each other than the wings to which the inner ends of the wires are fastened.

3. An airplane including an arrangement of superposed supporting surfaces in which the intermediate surface or surfaces is or are staggered forwardly of the lower supporting surface and the upper supporting surface is staggered rearwardly of the intermediate supporting surface or surfaces, the degree of stagger in each instance being such that the total number of supporting surfaces may be trussed together in a common plane.

4. An airplane including an arrangement of superposed supporting surfaces in which the intermediate surface or surfaces is or are staggered with respect to the lower supporting surface and the upper supporting surface is staggered with respect to the intermediate supporting surface or surfaces, the degree of stagger in each instance being such that a line passing vertically through the center of pressure of the lower supporting surface will intersect all of the supporting surfaces thereabove, together with wiring arranged to directly interconnect non-adjacent supporting surfaces by penetrating the supporting surface or surfaces intermediately located therebetween.

5. In an airplane, three or more supporting surfaces arranged one above the other in a manner such that a straight line passing through one of them will intersect them all, wing beams founding the supporting surfaces, the wing beams of the intermediate supporting surface or surfaces being longitudinally removed from a line passing through the corresponding beams of the supporting surface or surfaces next above and next beneath, and wiring for the wing structure in its entirety characterized by an arrangement in which the wires penetrate the intermediate supporting surface or surfaces and directly interconnect the supporting surface or surfaces next above and next beneath them in the plane of the corresponding beams thereof.

6. In an airplane, a body, three or more supporting surfaces extended intermediately across said body, wing-beams founding said surfaces, the beams of the intermediate surface or surfaces lying in upright planes unalined with the beams of the upper and lower surfaces, and tie-wires directly interconnecting said upper and lower surfaces and penetrating said intermediate surface or surfaces.

7. A wing post frame comprising a substantially vertical post section together with co-extensive post braces crossed at an intermediate point and connected with the post section at its opposite ends, the post braces being rigid and constituting with the vertical post section the only connection between the wings.

8. A wing-post for aeroplanes comprising a wing-post-frame completely covered except for a sight opening formed therein.

9. A wing-post for aeroplanes comprising a wing-post-frame enlarged at one end and completely covered except for a sight opening formed in said enlarged end.

10. In an aeroplane, a body, a cockpit formed in said body, a wing-structure including wing-posts erected on said body, each post comprising a wing-post-frame streamlined as a unit except for an opening formed in the post in the vicinity of said cockpit.

11. In an aeroplane, a body, supporting surfaces extending intermediately across said body, and wing-posts interconnecting said surfaces, the center posts diverging upwardly and the posts next adjacent thereto diverging downwardly to approximately equidistantly space the points of support of the upper supporting surface.

12. In an aeroplane, a body, supporting surfaces extended intermediately across said body, and wing-posts including cross-braces arranged to function conjointly as post braces and as compression members for said surfaces.

13. In an aeroplane, a body, supporting surfaces extended intermediately across said body, and a wing-post-frame comprising post struts interconnected in immediate proximity to said surfaces, said interconnections also functioning as compression members for said surfaces.

14. An aerofoil for aeroplanes including a marginal strip, ribs, retaining plates integral with said strip, and means for fastening the ribs to the several plates.

15. An aerofoil for aeroplanes including a metal marginal strip, ribs bifurcated at one end, retaining plates integral with said strips, the respective plates engaging in the bifurcations of said ribs, and a means for fastening the ribs to the several plates.

16. In an aeroplane, supporting surfaces, and wing beams founding said surfaces, each beam comprising separate contiguous I-beams together forming a relatively deep beam of box-form in transverse section.

17. In an airplane, a fuselage, two or more supporting surfaces arranged to extend intermediately across the fuselage in planes above it, fuselage posts arranged to extend upwardly from the fuselage for connection with the supporting surfaces, the posts being provided with sight openings, a cockpit formed in the fuselage at or near the wing posts, and means for fastening the wings of one supporting surface respectively to the posts in a manner such that a gap in the supporting surface equal to the space between said posts is provided.

18. In an airplane, a fuselage having a cockpit, a wing structure comprising two or more supporting surfaces mounted in planes above the fuselage, fuselage posts provided at opposite sides of the fuselage to extend upwardly therefrom for connection with the upper supporting surface, the supporting surface or surfaces beneath said upper surface and above the fuselage being connected with the fuselage posts and interrupted for a portion of their length an extent equal to the distance between the posts, and means covering the fuselage posts except for sight openings formed therein that vision from the cockpit in a lateral direction may be had.

In testimony whereof I hereunto affix my signature.

HENRY KLECKLER.